United States Patent
Rockliff

[15] 3,683,243
[45] Aug. 8, 1972

[54] ELECTRICAL HYGROMETERS

[72] Inventor: Peter Rockliff, Bradford, England

[73] Assignee: Moisture Control and Measurement Limited, Yorkshire, England

[22] Filed: Oct. 21, 1970

[21] Appl. No.: 82,236

[52] U.S. Cl..............................317/246, 73/336.5
[51] Int. Cl. ..............................................H01g 7/00
[58] Field of Search .....317/246, 260, 242; 73/336.5; 324/61 D

[56] References Cited

UNITED STATES PATENTS

| 2,321,439 | 6/1943 | Verwey | 317/242 X |
| 2,884,593 | 4/1959 | Miyata | 73/336.5 X |
| 2,943,488 | 7/1960 | Strobtz | 73/336.5 |
| 2,992,392 | 7/1961 | Haynes | 317/246 X |
| 3,037,165 | 4/1962 | Kerr | 317/246 X |

FOREIGN PATENTS OR APPLICATIONS 243,852   12/1925   Great Britain.............317/260

Primary Examiner—E. A. Goldberg
Attorney—Wolf, Greenfield & Sacks

[57] ABSTRACT

A sensor for an electrical hygrometer of the capacitance type comprises two metal wire electrodes one at least of which has a hygroscopic layer and the two wires are brought into intimate contact with one another to act as electrodes by twisting, wrapping or winding them together but electrically insulated from one another. The two wires may be of similar gauge and twisted to double helix form, or laid side by side and bound together, or a fine gauge one may be wound helically round a straight coarser gauge one leaving spaces between adjacent coils. The hygroscopic layer or layers may be oxidized by anodizing. A fine gauge enameled copper wire may be wound round an oxidized aluminum wire of coarser gauge. A guard surrounds the electrodes to protect the fine wires from damage.

5 Claims, 7 Drawing Figures

PATENTED AUG 8 1972 3,683,243

INVENTOR
PETER ROCKLIFF
BY
Wolf, Greenfield & Sacks

ELECTRICAL HYGROMETERS

This invention relates to electrical hygrometers of the so-called capacitance type and concerns the sensor which acts as the humidity detector. This sensor normally has one electrode consisting of a thin metal rod or a thick wire with an oxidized surface which forms a hygroscopic layer, and over this first layer is a thin outer layer which is electrically conductive and which forms the other electrode. This outer conductive layer has to be extremely thin and permeable to water vapor and often consists of pure gold evaporated or otherwise deposited onto the first layer. Such a method of manufacture is costly and requires a high degree of skill on the part of the operatives.

The present invention has for its chief object to provide an improved capacitance type hygrometer sensor of cheap and simple construction compared with those now in use or proposed but one which will nevertheless be sensitive, quick-acting and operative over a wide humidity range by reason substantially solely of its capacitance change property.

A sensor according to the invention comprises two metal wire electrodes, one at least of which is coated with a hygroscopic layer, the two wires being thereafter brought into intimate contact with one another along a length sufficient to act as electrodes by twisting, wrapping or winding them together but electrically insulated from one another, the two electrodes having connector means at one end of the sensor for connecting them electrically to the measuring circuit of a hygrometer.

The two electrodes may be of the same metal or each may be of a different metal. They may be of a similar gauge to one another and twisted together to form substantially a double helix; or they may be laid side by side and wrapped or bound together by a suitable binding material; or one may be twisted or wound around the other which is left untwisted, the former being of finer gauge than that of the latter.

The hygroscopic layer or layers may be an oxidized layer produced in any suitable manner, for example by depositing on the surface of the wire a layer of a metallic oxide, but preferably the oxidized layer is produced by anodizing the surface of the wire.

When the two electrodes are to be of a similar gauge of wire, it is preferred to form them from very pure aluminum of a finer gauge than that generally employed heretofore for such sensors. In such a case two separate lengths of wire may be given their oxidized layers and may then be brought together to form the two electrodes, but the production operations may be simplified by first treating a single length of wire over the necessary portions thereof and then dividing it into two parts to constitute the two electrodes.

In order that the nature of the invention and the manner of carrying it into effect may be more clearly understood, two methods of manufacture will now be described with reference to the accompanying drawings merely by way of example. In these drawings.

In the method of manufacture illustrated by FIGS. 1 to 6 of the drawings, a length of fine wire of, for example, 28 s.w.g. and of super pure aluminum, for example 99.99 percent purity is used. This is bent into a U-shaped loop to provide two limbs 1, 2 (see FIG. 1) which are then immersed in a suitable electrolyte such as a solution of sulphuric acid contained in a lead tank, and are anodized by passing an alternating current through the electrolyte, the strengths of solution and current and the time and temperature being suitably chosen as will be understood by those skilled in that art. The portions of the limbs thus anodized are indicated by X in FIGS. 1 to 4.

After anodizing is completed, the wire is thoroughly washed in hot water and dried. Then an insulating sleeve 3 of plastics material, for example polytetrofluorethylene (PTFE) is slipped onto one limb 1 so as to overlap slightly the anodized portion of that limb (see FIG. 2). The wire is then cut at the loop and the anodized portion of limb 2 is wound helically round the sleeve 3 at 4 leaving the anodized portion aligned close to the limb 1 (see FIG. 3) and extending so as to overlap slightly the end of sleeve 3.

Figure 1:
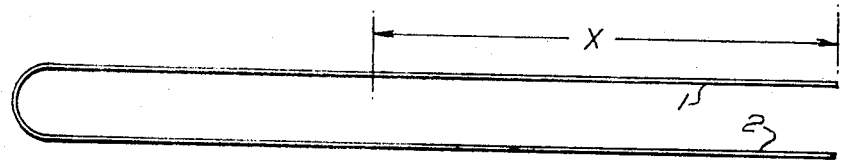
FIGS. 1 to 4 illustrate four stages in the production of a sensor according to one embodiment of the invention.
Figure 2:
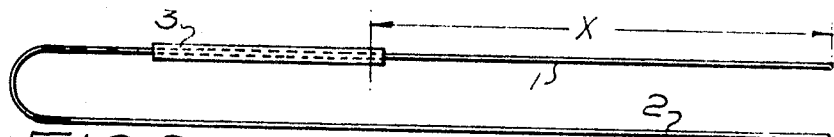
Figure 3:
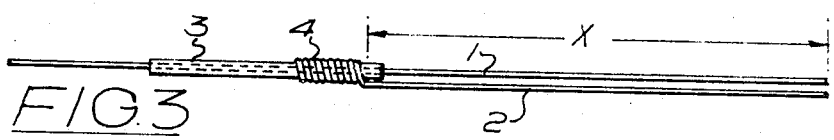
Figure 4:
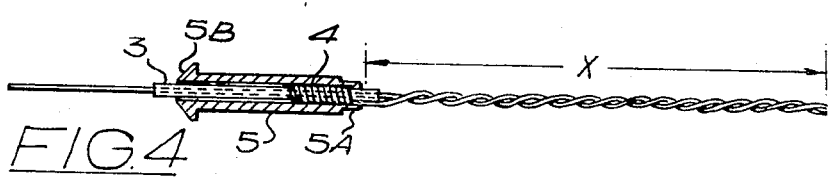
Figure 5:
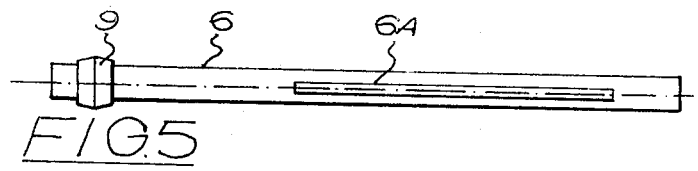
FIG. 5 illustrates a guard for protecting the electrodes from damage.

A soft metal electrically conductive ferrule 5 is then slipped over the sleeve 3 and secured in position by crimping its reduced diameter end 5A over the wire windings at 4 (see Fig. 4). This assembly can then be gripped by the ferrule while the anodized parts of the two limbs are twisted together helically at a predetermined number of uniform twists per unit length. This number governs the resultant properties of the sensor such as its efficiency and sensitivity and may be selected to suit the requirements of use for which each sensor is being produced, but as an example the number might be five turns per cm.

In the drawings the twisted together wires are shown for clarity as having a space or spaces between them, but in fact they will be in intimate contact throughout the twisted length.

It will be noted that the oxide layer on the two limbs acts as an insulator between the two wires as well as constituting the hygroscopic layer and the construction ensures that the sensor operates virtually solely by detecting capacitance change and not conductance change.

A tubular guard 6 with one or more slots 6A (see FIG. 5) or other openings is slipped over the assembly to protect the twisted wires from physical damage, one end being located against an annular shoulder on the rear face of a conical flange 5B on the ferrule 5. An olive 9 is fixed on the guard 6 and then this assembly is passed through a threaded union 8 until the olive 9 abuts a shoulder 10 on the union 8 (see FIG. 6). A coaxial plug 7 is then screwed into the union until its insulator 11 abuts the flange of the ferrule, the tightening together of the parts serving also to secure the guard to the ferrule.

Instead of using the above described construction in which two fine-gauge wires, both with oxidized surface layers, are twisted together to form a double helix, the invention may be carried out by twisting together one wire with an oxidized surface and a copper wire with an enameled surface. This construction reduces the tendency for a conductivity factor to develop when the sensor having two wires of the same metal twisted together is used in conditions of high humidity. On the other hand the sensitivity of this sensor is reduced due to the necessarily much greater thickness of the enamel layer compared with that of the oxidized layer, and also due to only one of the electrodes being hygroscopic.

Figure 7:
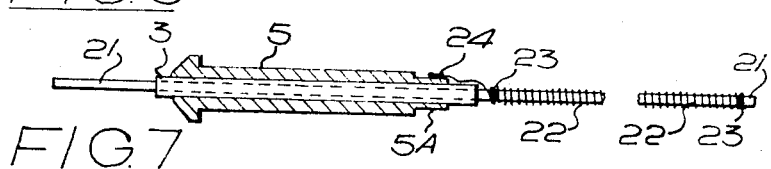
FIG. 7 illustrates a stage in the production of a second embodiment of the invention, this stage being equivalent to that shown in FIG. 4.

As a further alternative, the invention may be carried out using two different metals for the two electrodes and twisting one around the other which is left straight as illustrated in FIG. 7. For example, one electrode 21 is formed by a length of wire of super pure aluminum and of, for example, 19 s.w.g. which is anodized along part of its length but left perfectly straight.

Figure 6:
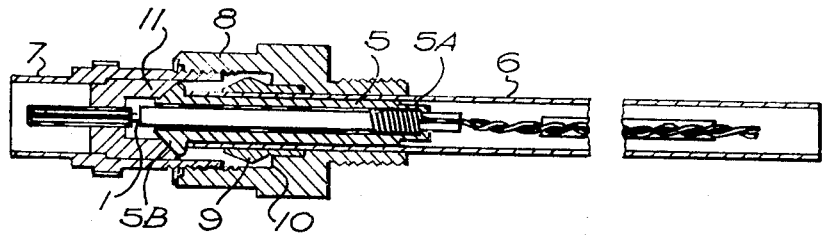
FIG. 6 illustrates on an enlarged scale how the two electrodes may be connected to and mounted upon a plug for connecting them to a measuring circuit.

The other electrode 22 is of copper and of, for example, 45 s.w.g. with the thinnest possible surface coating of enamel forming a non-hygroscopic insulating layer. This is wound under slight tension helically round the anodized part of the straight aluminum wire 21 with a slight spacing between adjacent coils, the winding extending along a suitable length of the aluminum wire for example 7 cms. An insulating sleeve 3 and ferrule 5 is applied over the wire 21 as illustrated in FIG. 4 and the wire 22 is secured to wire 21 at each end of the winding and at intermediate points if desired by a spot tacking 23 of epoxy resin or by any other suitable means. One end of wire 22 is then bared and secured at 24 to the end 5A of ferrule 5. The mounting ends of these electrodes can then be attached to connector means as illustrated in FIG. 6, including the guard 6 if desired.

One important advantage of the last two constructions described above is that they provide a good degree of stability of capacity even if the sensor is exposed to severe mechanical shock.

It will be understood that the coils of the helically wound lacquered copper wire must be spaced apart to allow the hygroscopic surface of the center wire to be reached by the gas or other substance to be tested by the hygrometer. Owing to the very fine gauge which can be used for the copper wire a considerable length can be wound on whilst still leaving exposed a substantial proportion of the hygroscopic surface.

Whilst round wire would preferably be used for the electrodes for reasons of manufacturing convenience, other convenient cross-sectional forms may be used.

As compared with known sensors using a single rod or thick wire of the order of 1.5 mm. diameter, the sensor of this invention can have a much smaller overall capacity thereby giving increased sensitivity also it may be constructed to detect variations in vapor pressure over a very wide range (particularly at the lower end of the scale), possibly from almost saturation conditions down to one part per million or less. It can be very sensitive and have a very rapid rate of response and operates at very low voltages of the order of millivolts.

Since the potential across the sensor of the invention can be extremely low, this sensor will be particularly suitable for use in hazardous conditions, for example, in the presence of highly volatile inflammable substances.

I claim:

1. A moisture sensor of the type exhibiting a change in electrical capacitance with a change in moisture, the sensor having two elongate electrodes, each electrode comprising a metal wire, at least one of the wires having adherent to its surface a thin film of an electrically insulative hygroscopic metal oxide, the wires being in intimate contact with one another for a substantial portion of their length, and each electrode being secured at one end to a connector.

2. The moisture sensor according to claim 1, wherein the wire electrodes are of pure aluminum and the hygroscopic metal oxide is an oxide of aluminum, and the two wires are twisted together in the form of a double helix.

3. The moisture sensor according to claim 1, wherein one wire is of a coarser gauge than the other wire, the coarser gauge wire having upon its surface the hygroscopic metal oxide thin film, and the surface of the finer gauge wire being covered by a thin coat of a non-hygroscopic electrical insulator, the finer gauge wire forming a helix around the coarser gauge wire with adjacent coils of the helix being spaced apart.

4. The moisture sensor according to claim 1, wherein one wire is of coarser gauge than the other wire, the coarser gauge wire being constituted of pure aluminum and having upon its surface the hygroscopic metal oxide thin film, the metal oxide being an oxide of aluminum, the finer gauge wire being of copper and having upon its surface a thin coat of enamel, and the finer gauge wire forming a helix about the other wire with adjacent coils of the helix being spaced apart.

5. The moisture sensor according to claim 1, wherein the connector comprises, an insulative sleeve in which is disposed a portion of one of the wires, the sleeve overlapping the hygroscopic film on that wire, and an electrically conductive ferrule situated over the sleeve, the other wire being electrically connected to the ferrule, and the ferrule having a flange adapted to be engaged by a current connector device.

* * * * *